United States Patent [19]

Sacripante et al.

[11] Patent Number: 5,413,888
[45] Date of Patent: May 9, 1995

[54] TONER WITH POLYIMIDE AND PIGMENT

[75] Inventors: Guerino G. Sacripante, Oakville; T. Brian McAneney, Burlington; Gopal K. Puri, Brampton, all of Canada

[73] Assignee: Xerox Corporation, Stamford, Conn.

[21] Appl. No.: 144,918

[22] Filed: Oct. 28, 1993

[51] Int. Cl.$^6$ .............................. G03G 9/087
[52] U.S. Cl. .................................. 430/106; 430/109; 430/110
[58] Field of Search ...................... 430/106, 106.6, 109, 430/110, 111

[56] References Cited

U.S. PATENT DOCUMENTS

| | | | |
|---|---|---|---|
| 4,513,074 | 4/1985 | Nash et al. | 430/106.6 |
| 4,520,090 | 5/1985 | Yamazaki et al. | 430/138 |
| 4,543,313 | 9/1985 | Mahabadi et al. | 430/109 |
| 4,560,635 | 12/1985 | Hoffend et al. | 430/106.6 |
| 5,238,768 | 8/1993 | Ong | 430/110 |

OTHER PUBLICATIONS

Encyclopedia of Polymer Science and Engineering, vol. 12, 2nd Edition, published by Wiley, (1985), pp. 364 to 383.

*Primary Examiner*—John Goodrow
*Attorney, Agent, or Firm*—E. O. Palazzo

[57] ABSTRACT

A toner composition comprised of pigment, and polyimide of the formula

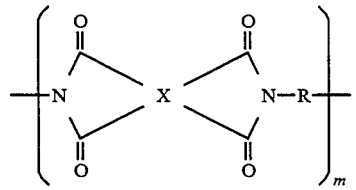

wherein m represents the number of monomer segments present; X is

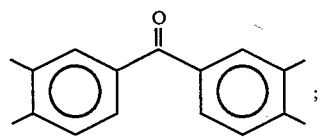

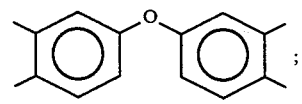

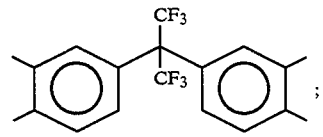

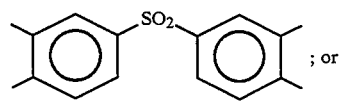

; or

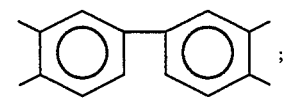

thus X can be benzophenone, oxydiphthalic, hexafluoropropane diphenyl, diphenyl sulfone, or biphenyl; X is attached to four imide carbonyl moieties; and R is independently selected from the group consisting of alkyl, oxyalkylene and polyoxyalkylene.

22 Claims, No Drawings

TONER WITH POLYIMIDE AND PIGMENT

BACKGROUND OF THE INVENTION

This invention is generally directed to toner and developer compositions, and more specifically, the present invention is directed to developer and toner compositions containing certain amorphous polyimide resins, and process for the preparation thereof. In embodiments, there are provided in accordance with the present invention, toner compositions comprised of certain polyimide resins, and pigment particles comprised of, for example, carbon black, magnetites, or mixtures thereof, cyan, magenta, yellow, blue, green, red, or brown components, or mixtures thereof thereby providing for the development and generation of black and/or colored images. In embodiments, there are provided in accordance with the present invention polyimide resins illustrated by the formula, and melt condensation processes thereof

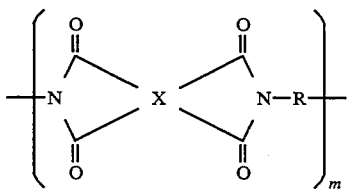

wherein X is

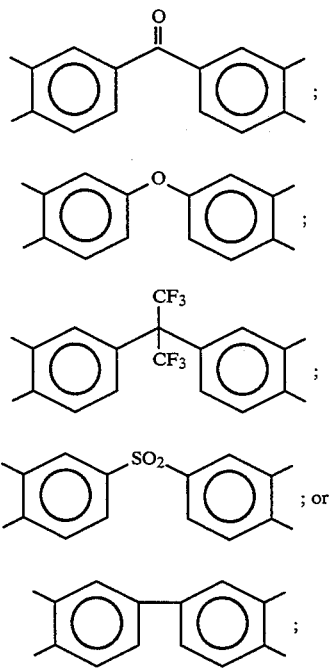

thus X can be benzophenone, oxydiphthalic, hexafluoropropane diphenyl, diphenyl sulfone, or biphenyl; and X is attached to four imide carbonyl moieties; and R is an alkyl, an alkylene, such as an alkylene oxide with from about 1 to about 25 carbon atoms, such as ethylene, diethylene oxide, triethylene oxide or a polyoxypropylene; and m represents the number of repeating segments, and can be a number of from about 50, preferably 100 to about 10,000. The toner compositions of the present invention in embodiments possess a number of advantages including gloss switching characteristics, which is the ability of a toner to provide either low or high gloss performance, low melting characteristics, excellent blocking characteristics, excellent admix characteristics, excellent nonvinyl-offset properties, and low relative humidity sensitivity such as from about 1.01 to about 2.3. The toner compositions of the present invention can in embodiments be generated by a preparative process involving the melt polycondensation of about 1 mole equivalent of dianhydride, such as benzophenone dianhydride, and of from about 1 mole equivalent of an alkylene diamine, or preferably a diaminoterminated alkylene oxides such as the diaminoterminated polypropylene oxide or diaminoterminated polyethylene oxide available from Texaco Chemicals as JEFFAMINE D-230 TM, D-400 TM, D-700 TM, EDR-148 TM, and EDR-192 TM as illustrated by the formula

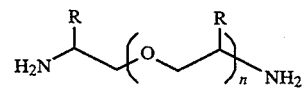

wherein

| | |
|---|---|
| EDR-148 | $n = 2; R = H$ |
| EDR-192 | $n = 3; R = H$ |
| D-230 | $n = 2,3; R = CH_3$ |
| D-400 | $n = 5,6; R = CH_3$ |

The aforementioned polyimides of the present invention exhibit in embodiments a number average molecular weight of from about 1,500 to about 50,000 and preferably 20,000 grams per mole as measured by vapor phase osmometry, and a glass transition temperature of from about 40° C. to about 80° C., and more preferably of from about 50° C. to about 65° C. as measured by the Differential Scanning Calorimeter. In another embodiment, the polyimides can be generated by a preparative process involving the reaction of about 0.7 mole equivalent to about 1 mole equivalent of dianhydride, such as benzophenone dianhydride, and of from about 0.7 to about 1 mole equivalent of an alkylene diamine, or preferably a diaminoterminated alkylene oxide, such as the diaminoterminated polypropylene oxide, or diaminoterminated polyethylene oxide available from Texaco as JEFFAMINE TM, and optionally a comonomer, such as a symmetrical aromatic or cyclic monomer, such as pyromellitic anhydride selected in amounts of from about 0.1 mole equivalent to about 0.3 mole equivalent, and wherein the polyimide resin resulting possesses a number average molecular weight of from about 1,500 to about 50,000 grams per mole as measured by vapor pressure osmometry, and a glass transition temperature of from about 40° C. to about 70° C., and more preferably of from about 50° C. to about 64° C. as measured by the Differential Scanning Calorimeter. In one embodiment, the present invention is directed to a toner composition comprised of a pigment, charge control agent and polyimide resins as illustrated herein with low fixing temperature of from about 120° C. to about 150° C., low gloss such as from about 0 to 30 gloss units at rapid fusing speeds, such as from about 200 to about 350 millimeters per second, or high gloss, such as from about 31 to about 90 gloss units at slower fusing speed, such as from about 50 to about 180 millimeters per second, with nonvinyl offset properties and in addition, low relative humidity sensitivity such as from about 1.0 to about 2.3.

Examples of advantages of the toner composition of the present invention comprised of the polyimides include gloss switching characteristics, such as the ability to provide low gloss such as from about 0 to 30 gloss units at rapid fusing speeds, such as from about 200 to about 500 millimeters per second, and the ability to provide high gloss, such as from about above 30 to about 90 gloss units at slower fusing speed such as from about 1 to about 180 millimeters per second. Furthermore, the toner compositions of the present invention in embodiments possess low fusing temperatures, such as from about 120° C. to about 140° C., and therefore lower fusing energies are required for fixing thus enabling less power consumption during fusing, and permitting extended lifetimes for the fuser system selected. Furthermore, the toner compositions of the present invention possess a broad fusing latitude, such as from about 40° C. to about 100° C., with minimal or avoidance of release oil, which inhibits the toner from offsetting onto the fuser rollers usually associated with ghosting or background images on subsequent copies. Additionally, the fused images obtained with the toner compositions of the present invention in embodiments do not substantially offset to vinyl covers, such as those utilized for notebook binders, and such toners possess low humidity sensitivity ratios of from about 1 to about 2.3 as calculated by the ratio of the triboelectric charge in microcoulombs per gram of the developer after placed in a chamber of 20 percent humidity for 48 hours, to the triboelectric charge in microcoulombs per gram of the developer after placed in a chamber of 80 percent humidity for 48 hours.

In designing resins for toner composition, it is generally desired and/or required that the glass transition temperature of the resin be from about 50° C. to about 65° C., and preferably no less than about 55° C., so that, for example, the toner particles do not aggregate, coalesce or block during the manufacturing, transport or storage process or until the toner is required for the fixing step. Additionally, low fusing characteristics are important, hence the resin should melt or flow as low in temperature as possible such as from about 130° C. to about 145° C. Moreover, low relative humidity sensitivity of toners is needed, such as from about 1.0 to about 2.3, so that the triboelectric charge is stable to changes in environmental humidity conditions. Additionally, in many instances, especially in highlight applications, low gloss documents are highly desired, that is from about 0 to 30 gloss units as measured by the 75° Gardner Gloss Metering Unit. Also, in many instances, especially in process or pictorial color applications, high gloss documents are highly desired, that is, from about above 30, for example 31, to about 80 gloss units as measured by the Gardner Gloss Metering Unit. Toners which display low gloss properties are known, and are for the most part comprised of a styrene-(meth)-acrylate or styrene butadiene resin, or crosslinked polyesters and pigment. Moreover, toners which display high gloss characteristics are also known, such as those comprised of a linear polyester resin and pigment, or comprised of a styrene based resin and pigment, and fused at temperature of from about 160° C. to about 180° C. Although, copiers and printers can be designed with several toners, or different fuser designs such that both low and high gloss prints or copies are generated, this can be very costly and is not considered practical. In the present invention, toner compositions comprised of certain polyimide resins and pigments display both high gloss and low gloss characteristics depending, for example, primarily on the fusing speed of the fuser rolls during the transfix step. For instance, a toner composition comprised of a polyimide of the present invention and pigment displays low gloss characteristics of from about 0 to about 30 gloss units as measured by the Gardner Gloss Metering Unit, when the fusing speed is set at greater than about 200 millimeters per second. When the fusing speed is set between 100 and 180 millimeters per second, higher gloss is obtained, such as from about above 30 to about 90 gloss units. Hence, by systematically setting the fusing speed of a printer or copier by the press of a button, low gloss, a matte finish, or high gloss can be obtained. Furthermore, with the toners of the present invention in embodiments, low fixing temperatures, such as from about 130° C. to about 150° C., are utilized and need not be changed for the production of low or high gloss documents. Additionally, the polyimide toners of this invention display a broad fusing latitude such as from about 40° C. to about 100° C. with minimal or avoidance of release oil, which oil inhibits the toner from offsetting onto the fuser rollers usually associated with ghosting or background images on subsequent copies. Furthermore, the fused image obtained from the toner composition of the present invention in embodiments does not substantially offset to vinyl covers, such as those utilized for notebook binders, and these toners possess low humidity sensitivity ratio of from about 1 to about 2.3 as calculated by taking the ratio of the triboelectric charge, in microcoulombs per gram, of the developer after placed in a chamber of 20 percent humidity for 48 hours, to the triboelectric charge, in microcoulombs per gram, of the developer after placed in a chamber of 80 percent humidity for 48 hours. Toners with polyimide resins derived from a mesogenic dianhydride and organo diamine can exhibit low fixing of from about 120° C. to about 140° C., high gloss, such as from about 50 gloss units to about 80 gloss units, nonvinyl offset properties and low relative sensitivity, such as from about 1.0 to about 2.3. Moreover, by utilizing prior art toners comprised of styrene-butadiene or polyester resins and pigments, both high and low gloss documents may not usually be obtained by changing the speed of the fuser rolls, while maintaining the same low minimum fixing temperatures, as illustrated herein in Comparative Examples VIII and IX.

Illustrated in the following copending applications, the disclosures of each being totally incorporated herein by reference, are:

U.S. Ser. No. 144,075, filed concurrently herewith, illustrates a toner composition comprised of a pigment and a crosslinked polyimide; and wherein the crosslinked polyimide can be obtained from the reaction of a peroxide with an unsaturated polyimide of the formula

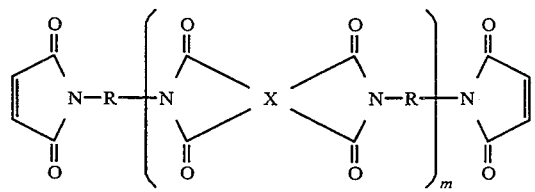

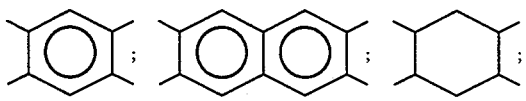

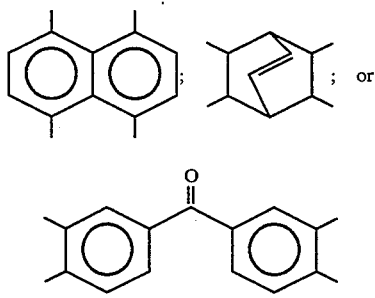

R is alkyl or oxyalkylene and m represents the number of monomer segments present and is a number of from about 10 to about about 1,000.

U.S. Pat. No. 5,348,930 illustrates a toner composition comprised of a pigment, and a thermotropic liquid crystalline polyimide of the formula

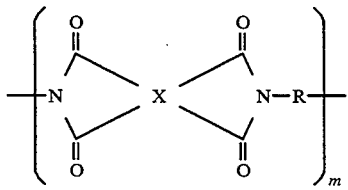

wherein m represents the number of monomer segments present; X is a symmetrical moiety independently selected from the group consisting of phenyl, naphthyl, cyclohexyl, or bicycloaliphatic; and R is independently selected from the group consisting of alkyl, oxyalkylene and polyoxyalkylene.

U.S. Ser. No. 144,956, filed concurrently herewith, illustrates a toner composition comprised of pigment, and polyimide of the formula

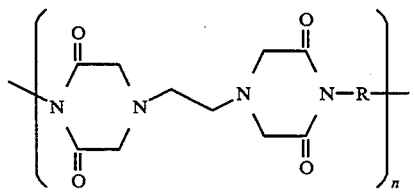

wherein n represents the number of monomer segments, and is a number of from about 10 to about 1,000; and R is alkyl, oxyalkyl, or polyoxyalkyl.

U.S. Pat. No. 5,348,831 illustrates a toner composition comprised of pigment, and a polyester imide resin of the formula

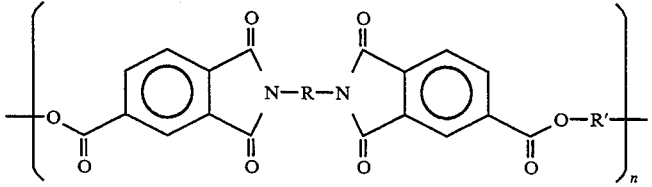

wherein n represent the number of segments present and is a number of from about 10 to about 10,000; R' is alkyl or alkylene; and R is independently selected from the group consisting of an oxyalkylene and polyoxyalkylene.

Polyimide resins and, more specifically, liquid crystalline polyimide resins are also known, such as summarized and illustrated in the *Encyclopedia of Polymer Science and Engineering*, 2nd Edition, Volume No. 12, Published by Wiley (1985). However, these polyimide resins are aromatic and useful as high performance materials, and toner use is not described. Moreover, the polyimide resins of the present invention and, more specifically, polyimides with flexible diamino alkane moieties and also polyoxyalkylene moieties are not believed to be disclosed.

SUMMARY OF THE INVENTION

It is an object of the present invention to provide toner and developer compositions with many of the advantages illustrated herein.

In another object of the present invention there are provided toner compositions with certain polyimides or amorphous polyimides, and which toners are useful for the development of electrostatic latent images including color images.

In yet another object of the present invention there are provided processes for the preparation of polyimide resins.

Moreover, in another object of the present invention there are provided toner compositions comprised of polyimides with low melt fusing temperatures of from about 120° C. to about 150° C.

Moreover, in another object of the present invention there are provided toner compositions comprised of polyimides or isotropic polyimides with low melt fusing temperatures of from about 130° C. to about 145° C. and broad fusing latitudes of from about 30° C. to about 60° C.

Moreover, in another object of the present invention there are provided toner compositions comprised of polyimides with glass transition temperature of from about 50° C. to about 65° C.

In yet another object of the present invention there are provided toner compositions comprised of polyimide resins with a number average molecular weight of from about 1,500 grams per mole to about 100,000 grams per mole as measured by GPC.

In yet in another object of the present invention there are provided developer compositions comprised of a toner which displays high projection efficiency on, for example, a transparency such as from about 60 to about 99 percent projection determined on a Match Scan II spectrophotometer available from Diana.

Moreover, it is an object of the present invention to provide a toner which displays high gloss such as from about 31 to about 90 gloss units as measured by the Gardner Gloss Metering Unit at slower fusing speeds of from about 11 to about 180 millimeters per second.

Moreover, it is an object of the present invention to provide a toner which displays low gloss, such as from about 0 to about 30 gloss units as measured by the Gardner Gloss Metering Unit, at fast fusing speeds of from about 200 millimeters per second to about 350 millimeters per second.

Moreover, it is an object of the present invention to provide a toner which displays low relative sensitivity such as from about 1.0 to about 2.3 as measured from the triboelectric charge ratio of 20 percent humidity level to 80 percent humidity level.

Another object of the present invention resides in the formation of toners which will enable the development of images in electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 70 copies per minute.

Also, in another object of the present invention there are provided developer compositions comprised of toner, and carrier particles.

These and other objects of the present invention can be accomplished in embodiments thereof by providing toner compositions comprised of polyimides of the formulas as illustrated herein, and pigment particles.

The polyimide resins of the present invention can be prepared as illustrated herein, and more specifically by charging a reactor equipped with a bottom drain valve, double turbine agitator and distillation receiver with a cold water condenser with from about 0.95 to about 1.05 mole of dianhydride, such as benzophenone dianhydride or 4,4-oxydiphthalic anhydride, 0.95 to about 1.05 mole of flexible aliamine, such as diaminoterminated polyoxypropylene available as JEFFAMINE 230 ™ from Texaco Chemicals, and optionally a terminating agent to control the molecular weight, such as aminodecane of from about 0.005 to about −0.1 mole equivalent of the polyimide. The reactor is then heated to about 150° C. to about 170° C. with stirring for a duration of from about 3 hours whereby 0.5 to about 0.9 mole of water byproduct is collected in the distillation receiver. The mixture is then heated at from about 180° C. to about 210° C., after which the pressure is slowly reduced from atmospheric pressure to about 300 Torr, over a period of from about one hour to about 5 hour period with collection of approximately 0.1 to about 0.3 mole of water in the distillation receiver, and wherein the total amount of water collected from the beginning of the reaction is from about 0.95 to about 1.0 mole equivalent. The reactor is then purged with nitrogen to atmospheric pressure, and the resulting products like poly(oxypropylene-benzophenone-imide) collected through the bottom drain valve. The glass transition temperature of the resin can then be measured to be of from about 45° C. to about 65° C. (onset) utilizing the 910 Differential Scanning Calorimeter available from E.I. DuPont operating at a heating rate of 10° C. per minute. The number average molecular weight was measured by vapor phase calorimetry to be from about 1,500 grams per mole to about 100,000 grams per mole in embodiments.

Specific examples of polyimide resins of the present invention include poly(2-methylpentyl benzophenone-imide), poly(hexyl benzophenone-imide), poly(octyl pentyl benzophenone-imide), poly(dodecyl pentyl benzophenone-imide), poly(trimethylhexyl benzophenone-imide), poly(diethoxy benzophenone-imide), poly(triethoxy benzophenone-imide), poly(diisopropoxy benzophenone-imide), poly(trisopropoxy benzophenone-imide), poly(2-methylpentyl 3,3,4,4'-biphenyl-imide), poly(hexyl 3,3,4,4'-biphenyl-imide), poly(octyl pentyl 3,3,4,4'-biphenyl-imide), poly(dodecyl pentyl 3,3,4,4'-biphenyl-imide), poly(trimethylhexyl 3,3,4,4'-biphenyl-imide), poly(diethoxy 3,3,4,4'-biphenyl-imide), poly(triethoxy 3,3,4,4'-biphenyl-imide), poly(diisopropoxy 3,3,4,4'-biphenyl-imide), poly(trisopropoxy 3,3,4,4'-biphenyl-imide), poly(tetraisopropoxy 3,3,4,4'-biphenyl-imide), poly(pentisopropoxy 3,3,4,4'-biphenyl-imide), poly(diethoxy 4,4'-oxydiphthalimide), poly(triethoxy 4,4'-oxydiphthalimide), poly(diisopropoxy 4,4'-oxydiphthalimide), poly(trisopropoxy 4,4'-oxydiphthalimide), poly(tetraisopropoxy 4,4'-oxydiphthalimide), poly(pentisopropoxy 4,4'-oxydiphthalimide), poly(diethoxy 3,3', 4,4'-diphenylsulfone-imide), poly(triethoxy 3,3', 4,4'-diphenylsulfone-imide), poly(diisopropoxy 3,3',4,4'-diphenylsulfone-imide), poly(trisopropoxy 3,3',4,4'-diphenylsulfone-imide), poly(tetraisopropoxy 3,3',4,4'-diphenylsulfone-imide), poly(pentisopropoxy 3,3',4,4'-diphenylsulfone-imide), and mixtures thereof and the like, which resin is present in the toner in various effective amounts, such as from about 85 percent by weight to about 98 percent by weight of the toner comprised of, for example, resin and pigment.

Specific examples of terminating agents that can be utilized to prepare the polyimide resins include aminoethane, aminopropane, aminobutane, aminopentane, 2-aminopentane, aminohexane, aminoheptane, aminooctane, aminononane, aminodecane, aminododecane, aniline, mixtures thereof and the like, and which agents can be selected in typical amounts of from about 0.005 mole equivalent to about 0.1 mole equivalent of the polyimide.

Specific examples of dianhydrides or tetracids that can be utilized to prepare the polyimide resins include 3,3',4,4'-benzophenone tetracarboxylic dianhydride also known as benzophenone dianhydride, 3,3',4,4'-biphenyl tetracarboxylic dianhydride, 2,2'-bis-(3,4-dicarboxyphenyl) hexafluoropropane dianhydride, 4,4'-oxydiphthalic anhydride, 3,3',4,4'-diphenylsulfone tetracarboxylic dianhydride, mixtures thereof and the like selected in various effective amounts of, for example, from about 0.45 to about 0.55 mole equivalent of polyimide.

Specific examples of diamino alkanes or diamino alkylene oxide that can be utilized to prepare the polyimide resin include diaminoethane, diaminopropane, 2,3-diaminopropane, diaminobutane, diaminopentane, diamino-2-methylpentane also known as DYTEK A ™ available from E.I. DuPont Chemical Company, diaminohexane, diamino-trimethylhexane, diaminoheptane, diaminooctane, diaminononane, diaminodecane, diaminododecane, diaminoterminated-ethylene oxide, diaminoterminated-diethylene oxide available as JEFFAMINE EDR-148 ™ from Texaco Chemicals, diaminoterminated-diethylene oxide available as JEFFAMINE EDR-148 ™ from Texaco Chemicals, diaminoterminated-triethylene oxide available as JEFFAMINE EDR-192 ™ from Texaco Chemicals, diaminoterminated-polyoxypropylene oxide available as JEFFAMINE D-230 ™, JEFFAMINE 400 ™, JEFFAMINE 700 ™ all available from Texaco Chemicals, mixtures thereof and the like, and this component can be selected in various effective amounts of, for example, from about 0.45 mole equivalent to about 0.55 mole equivalent of polyimide resin.

Various known colorants present in the toner in an effective amount of, for example, from about 1 to about 25 percent by weight of toner, and preferably in an amount of from about 1 to about 15 weight percent, that can be selected include carbon black like REGAL 330® magnetites, such as Mobay magnetites MO8029 ™, MO8060 ™; Columbian magnetites; MAPICO BLACKS ™ and surface treated magnetites; Pfizer magnetites CB4799 ™, CB5300 ™, CB5600 ™, MCX6369 ™; Bayer magnetites BAYFERROX 8600 ™, 8610 ™; Northern Pigments magnetites NP-604 ™, NP-608 ™; Magnox magnetites TMB-100 ™, or TMB-104 ™; and other equivalent black pigments. As colored pigments there can be selected known cyan, magenta, yellow, red, green, brown, blue or mixtures thereof. Specific examples of pigments include HELIOGEN BLUE L6900 ™, D6840 ™, D7080 ™, D7020 ™, PYLAM OIL BLUE ™ and PYLAM OIL YELLOW ™, PIGMENT BLUE 1 ™ available from Paul Uhlich & Company, Inc., PIGMENT VIOLET 1 ™, PIGMENT RED 48 ™, LEMON CHROME YELLOW DCC 1026 ™, E.D. TOLUIDINE RED ™ and BON RED C ™ available from Dominion Color Corporation, Ltd., Toronto, Ontario, NOVAperm YELLOW FGL ™, HOSTAPERM PINK E ™ from Hoechst, and CINQUASIA MAGENTA ™ available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK ™, and cyan components may also be used as pigments. The pigments are selected in various effective amounts of, for example, from about 1 weight percent to about 65 weight percent of the toner.

The toner may also include in effective amounts, such as from about 0.1 to about 10 weight percent, known charge additives, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and wherein there is illustrated in the '635 patent a toner with a distearyl dimethyl ammonium methyl sulfate charge additive, and negative charge additives, such as aluminum complexes available from Orient as BONTRON E-88 ™, those illustrated in U.S. Pat. No. 5,223,368, the disclosure of which is totally incorporated herein by references, and the like.

Surface additives in effective amounts, such as from about 0.1 to about 3 weight percent, that can be added to the toner compositions of the present invention include, for example, metal salts, metal salts of fatty acids, colloidal silicas, mixtures thereof and the like, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. Also, low molecular weight waxes, such as with an $M_w$ of from about 1,000 to about 10,000, such as polypropylene, polyethylene, and the like in effective amounts of, for example, from about 0.1 to about 3 weight percent, can be added to the toner.

In another embodiment of the present invention, there are provided subsequent to known micronization and classification toner particles with an average volume diameter as determined by a Coulter Counter of from about 5 to about 20 microns comprised of a polyimide resin, pigment particles, and optional charge enhancing additive.

The polyimide resin is present in a sufficient, but effective amount, for example from about 70 to about 95 weight percent in embodiments. Thus, when 1 percent by weight of the charge enhancing additive is present, and about 10 percent by weight of pigment or colorant, such as carbon black, is contained therein, about 89 percent by weight of resin is selected. Also, the charge enhancing additive may be coated on the pigment particle.

The toner and developer compositions of the present invention may be selected for use in electrostatographic imaging apparatuses containing therein conventional photoreceptors. Thus, the toner and developer compositions of the present invention can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

Developer compositions include carrier particles, and the polyimide toners illustrated herein, examples of carriers being steel, iron, ferrites, silicon oxides, and the like, reference for example U.S. Pat. Nos. 4,937,166 and 4,935,326, the disclosures of which are totally incorporated herein by reference.

The following Examples are being supplied to further define various species of the present invention, it being noted that these Examples are intended to illustrate and not limit the scope of the present invention. Parts and percentages are by weight unless otherwise indicated.

EXAMPLE I

A polyimide resin derived from benzophenone dianhydride and diaminoterminated polyoxypropylene with an average molecular weight of 230 and available as JEFFAMINE D-230 ™ from Texaco Chemical Company was prepared as follows:

3,3',4,4'-Benzophenone tetracarboxylic dianhydride (113 grams) and JEFFAMINE D-230 TM (81 grams) were charged into a 300 milliliter Parr reactor equipped with a mechanical stirrer, distillation receiver and bottom valve drain. The resulting mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then increased to 225° C. for another 30 minutes. The bottom drain of the reactor was then opened, and the polyimide resin was allowed to pour into a container cooled with dry ice, and measured to be 138 grams. The number average molecular weight of the resin resulting was then measured to be 7,700 grams per mole as measured by vapor pressure osmometry using toluene as the solvent. The glass transition temperature of the resin product was measured to be 87° C. with the DuPont Differential Scanning Calorimeter at 10° C. per minute. 1.8 Grams of the aforementioned polyimide resin were then pressed into a pellet and subjected to the Shimadzu −500 Flowtester operated from room temperature to 130° C. at 10° C. per minute and utilizing a load of 20 kilograms with a die diameter and length of 1 millimeter by 2 millimeters. The softening temperature was found to be 105° C., the beginning of flow temperature ($T_1$) was found to be 124° C., and flow temperature ($T_2$) was found to be 130° C.

EXAMPLE II

A polyimide resin derived from benzophenone dianhydride and diaminoterminated polyoxypropylene with an average molecular weight of 400 and available as JEFFAMINE D-400 TM from Texaco Chemical Company was prepared as follows:

3,3',4,4'-Benzophenone tetracarboxylic dianhydride (113 grams) and JEFFAMINE D-400 TM (141 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then to 225° C. for another 30 minutes. The bottom drain of the reactor was then opened, and the polyimide resin was allowed to pour into a container cooled with dry ice, and measured to be 180 grams. The number average molecular weight of the resin resulting was then measured to be 11,500 grams per mole as measured by vapor pressure osmometry using toluene as the solvent. The glass transition temperature of the resin product was measured to be 9.8° C. with the E.I. DuPont Differential Scanning Calorimeter at 10° C. per minute.

EXAMPLE III

A polyimide resin derived from 0.5 mole equivalent of benzophenone dianhydride, 0.25 mole equivalent of JEFFAMINE D-400 TM and 0.25 mole equivalents of JEFFAMINE D-230 TM was prepared as follows:

3,3',4,4'-Benzophenone tetracarboxylic dianhydride (113 grams), JEFFAMINE D-230 TM (40.5 grams) and JEFFAMINE D-400 TM (70.5 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) was collected. The reactor temperature was then increased to 200° C. with slow purging of nitrogen for 30 minutes and then to 225° C. for another 30 minutes. The bottom drain of the reactor was then opened, and the polyimide resin was allowed to pour into a container cooled with dry ice, and measured to be 160 grams. The number average molecular weight of the resin resulting was then measured to be 10,900 grams per mole as measured by vapor pressure osmometry using toluene as the solvent. The glass transition temperature of the resin was measured to be 43.5° C. with the E.I. DuPont Differential Scanning Calorimeter at 10° C. per minute. 1.8 Grams of aforementioned polyimide resin product were then pressed into a pellet and subjected to the Shimadzu −500 Flowtester operated from room temperature to 130° C. at 10° C. per minute, and utilizing a load of 20 kilograms with a die diameter and length of 1 millimeter by 2 millimeters. The softening temperature was found to be 70° C., the beginning of flow temperature ($T_1$) was found to be 90° C., and flow temperature ($T_2$) was found to be 116° C.

EXAMPLE IV

A polyimide resin derived from 0.5 mole equivalent of benzophenone dianhydride, 0.05 mole equivalent of JEFFAMINE D-400 TM and 0.45 mole equivalent of JEFFAMINE D-230 TM was prepared as follows: 3,3',4,4'-Benzophenone tetracarboxylic dianhydride (113 grams), JEFFAMINE D-230 TM (73 grams) and JEFFAMINE D-400 TM (14 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then the temperature was increased to 225° C. for another 30 minutes. The bottom drain of the reactor was then opened, and the polyimide resin was allowed to pour into a container cooled with dry ice, and measured to be 160 grams. The number average molecular weight of the resin resulting was 8,900 grams per mole as measured by vapor pressure osmometry using toluene as the solvent. The glass transition temperature of the resin was measured to be 74° C. with the E.I. DuPont Differential Scanning Calorimeter at 10° C. per minute. 1.8 Grams of aforementioned polyimide resin were then pressed into a pellet and subjected to the Shimadzu −500 Flowtester operated from room temperature to 130° C. at 10° C. per minute and utilizing a load of 20 kilograms with a die diameter and length of 1 millimeter by 2 millimeters. The softening temperature was found to be 100° C., the beginning of flow temperature ($T_1$) was found to be 117° C., and flow temperature ($T_2$) was found to be 130° C.

EXAMPLE V

A polyimide resin derived from 0.5 mole equivalent of benzophenone dianhydride, 0.05 mole equivalent of JEFFAMINE D-400 TM, 0.45 mole equivalent of JEFFAMINE D-230 TM and 0.026 mole equivalent of dodecyl amine as terminating agent was prepared as follows:

3,3',4,4'-Benzophenone tetracarboxylic dianhydride (113 grams), JEFFAMINE D-230 TM (73 grams), 1.7 grams of dodecyl amine and JEFFAMINE D-400 TM (14 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then increased to 225° C. for another 30 minutes. The bottom drain of the reactor was then opened, and the polyimide resin terminated with dodecyl amine was allowed to pour into a container cooled with dry ice, and measured to be 158 grams. The number average molecular weight of the resin resulting was 5,600 grams per mole as measured by vapor pressure osmometry using toluene as the solvent. The glass transition temperature of the resin was measured to be 68° C. with an E.I. DuPont Differential Scanning Calorimeter at 10° C. per minute. 1.8 Grams of aforementioned polyimide resin were then pressed into a pellet and subjected to the Shimadzu −500 Flowtester operated from room temperature to 130° C. at 10° C. per minute, and utilizing a load of 20 killigrams with a die diameter and length of 1 millimeter by 2 millimeters. The softening temperature was found to be 95° C., the beginning of flow temperature ($T_1$) was found to be 115° C., and flow temperature ($T_2$) was found to be 129° C.

EXAMPLE VI

A polyimide resin derived from 0.5 mole equivalent of benzophenone dianhydride, 0.05 mole equivalent of JEFFAMINE D-400 TM, 0.45 mole equivalent of JEFFAMINE D-230 TM and 0.052 mole equivalent of dodecyl amine as terminating agent was prepared as follows:

3,3',4,4'-Benzophenone tetracarboxylic dianhydride (113 grams), JEFFAMINE D-230 TM (73 grams), 3.4 grams of dodecyl amine and JEFFAMINE D-400 TM (14 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then increased to 225° C. for another 30 minutes. The bottom drain of the reactor was then opened, and the polyimide resin terminated with dodecyl amine was allowed to pour into a container cooled with dry ice, and measured to be 156 grams. The number average molecular weight of the resin resulting was 4,900 grams per mole as measured by vapor pressure osmometry using toluene as the solvent. The glass transition temperature of the resin was measured to be 64° C. with the DuPont Differential Scanning Calorimeter at 10° C. per minute. 1.8 Grams of aforementioned polyimide resin were then pressed into a pellet and subject to the Shimadzu −500 Flowtester operated from room temperature to 130° C. at 10° C. per minute, and utilizing a load of 20 kilograms with a die diameter and length of 1 millimeter by 2 millimeters. The softening temperature was found to be 89° C., the beginning of flow temperature ($T_1$) was found to be 104° C., and flow temperature ($T_2$) was found to be 120° C.

EXAMPLE VII

A polyimide resin derived from 0.5 mole equivalent of benzophenone dianhydride, 0.075 mole equivalent of JEFFAMINE D-400 TM, 0.425 mole equivalent of JEFFAMINE D-230 TM and 0.052 mole equivalent of dodecyl amine as terminating agent was prepared as follows:

3,3',4,4'Benzophenone tetracarboxylic dianhydride (113 grams), JEFFAMINE D-230 TM (69 grams), 3.4 grams of dodecyl amine and JEFFAMINE D-400 TM (21 grams) were charged into a 300 milliliter Parr reactor equipped with a mechanical stirrer, distillation receiver and bottom valve drain. The mixture was heated to 150° C. and stirred for 30 minutes, followed by increasing the temperature to 175° C. whereby water started to distill. The mixture was then maintained at 175° C. for 2 hours whereby 10 grams of water (90 percent) were collected. The reactor temperature was then increased to 200° C. with slow purging of nitrogen for 30 minutes and then increased to 225° C. for another 30 minutes. The bottom drain of the reactor was then opened, and the polyimide resin terminated with dodecyl amine was allowed to pour into a container cooled with dry ice, and measured to be 155 grams. The number average molecular weight of the resin resulting was 4,300 grams per mole as measured by vapor pressure osmometry using toluene as the solvent. The glass transition temperature of the resin was measured to be 56° C. with an E.I. DuPont Differential Scanning Calorimeter at 10° C. per minute. 1.8 Grams of aforementioned polyimide resin were then pressed into a pellet and subjected to the Shimadzu −500 Flowtester operated from room temperature to 130° C. at 10° C. per minute, and utilizing a load of 20 kilograms with a die diameter and length of 1 millimeter by 2 millimeters. The softening temperature was found to be 80° C., the beginning of flow temperature ($T_1$) was found to be 98° C., and flow temperature ($T_2$) was found to be 117° C.

EXAMPLE VIII

A toner composition comprised of 98 percent by weight of the polyimide resin of Example VII and 2 percent by weight of PV FAST BLUE TM pigment was prepared as follows:

The polyimide resin of Example VII was in the form of a large chunk. The resulting polymer was ground to about 500 microns average volume diameter in a Model J Fitzmill equipped with an 850 micrometer screen. After grinding, 117.6 grams, 98 percent by weight of the total toner components, of the polyimide resin polymer were mixed with 2.4 grams of PV FAST BLUE TM pigment, 2 percent by weight of toner, and which pigment is available from Hoechst Chemical Corporation. The resulting two components were dry blended first on a paint shaker and then on a roll mill. A small CSITM counterrotating twin screw extruder available from Customs Scientific Instrumentations was then used to melt mix the aforementioned mixture at a barrel temperature of 140° C., screw rotational speed of 50 rpm and at a feed rate of 2 grams per minute. The extruded strands were broken into coarse particles utilizing a coffee bean grinder available from Black and Decker. An 8 inch Sturtevant micronizer was used to reduce the particle size further. After grinding, the resulting toner was measured to display an average volume diameter particle size of 9.0 microns with a geometric distribution of 1.39 as measured by the Coulter Counter. The resulting toner was then utilized without further classification.

A developer composition was prepared by roll milling the aforementioned prepared toner, 3 parts by weight with 100 parts by weight of Xerox Corporation carrier comprised of a steel core with polyvinylidene fluoride polymer (KYNAR ®) coating thereover with a weight coating of 0.175 weight percent. The tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was 1.9. Unfused copies were then produced using a laboratory imaging apparatus like the Xerox Corporation 1075 and with the fusing system disabled. The unfused copies were then subsequently fused on the laboratory test fixture using a process speed of 6.3 inches per second (160 millimeters/second). Fusing evaluation of the toner indicated a minimum fixing temperature of about 125° C., and no hot-offset temperature was observed at the maximum temperature of 200° C. Unfused copies were then fused at 150° C. at varying process speeds ranging from 5.1 inches per second (130 millimeters/second) to 12.6 inches per second (320 millimeters/second). The image gloss varied from 74 gloss units, at the lowest process speed, to 18 gloss units, at the highest process speed. The fix level of the toner was excellent over the entire range of these process speeds.

COMPARATIVE EXAMPLE IX

A toner composition comprised of 98 percent by weight of polyester resin derived from propoxylated bisphenol A, terephthalic acid and cyclohexane dimethanol, available from Dainippon Ink Company, and 2 percent by weight of PV FAST BLUE TM pigment was prepared utilizing the same procedure as Example VIII.

Unfused copies were then produced using a Xerox Corporation 1075 imaging apparatus with the fusing system disabled. The unfused copies were then subsequently fused on a VITON ® coated fuser using a process speed of 11.9 inches per second. Fusing evaluation of the toner indicated a minimum fixing temperature of about 140° C., and a hot-offset temperature was observed at 200° C. Unfused copies were then fused at 150° C. at varying process speeds ranging from 3.9 inches per second (100 millimeters/second) to 8.6 inches per second (220 millimeters/second). The image gloss varied from 80 gloss units, at the lowest process speed, to 52 gloss units, at the highest process speed. Attempts to operate this toner at process speeds greater than 8.6 inches per second resulted in unacceptable toner fix levels. Therefore, the minimum gloss level that could be achieved for this toner, while still maintaining acceptable fix levels, was 52 gloss units rendering this toner unsuitable for gloss switching applications.

COMPARATIVE EXAMPLE X

A toner composition comprised of 98 percent by weight of polyester resin derived from dodecylsuccinic anhydride and propoxylated bisphenol A, and 2 percent by weight of PV FAST BLUE TM pigment was prepared utilizing the procedure of Example VIII.

Fusing evaluation of the toner indicated a minimum fixing temperature of about 147° C. and a hot-offset temperature was observed at a temperature of 200° C.. Unfused copies were then fused at 150° C. at varying process speeds ranging from 6.3 inches per second (160 millimeters/second) to 8.3 inches per second (210 millimeters/second). The image gloss varied from 70 gloss units, at the lowest process speed, to 54 gloss units, at the highest process speed. Attempts to operate this toner at process speeds greater than 8.3 inches per second resulted in unacceptable toner fix levels, that is the toner could be removed. Therefore, the minimum gloss level that could be achieved for this toner, while still maintaining acceptable fix levels, was 54 gloss units rendering this toner unsuitable for gloss switching applications.

Other embodiments and modifications of the present invention may occur to those skilled in the art subsequent to a review of the information presented herein; these embodiments and modifications, as well as equivalents thereof, are also included within the scope of this invention.

What is claimed is:

1. A toner composition comprised of pigment, and polyimide of the formula

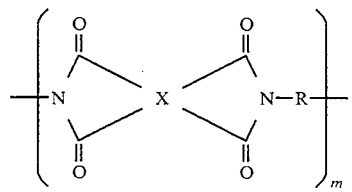

wherein m represents the number of monomer segments present; X is

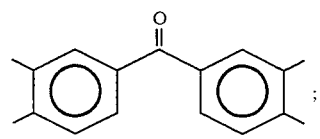

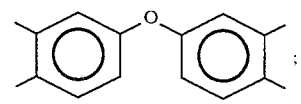

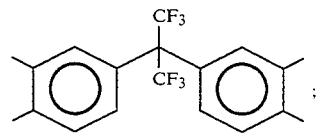

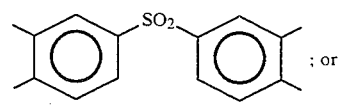; or

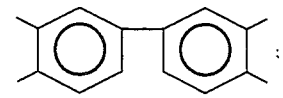;

and R is independently selected from the group consisting of alkyl, oxyalkylene and polyoxyalkylene.

2. A toner in accordance with claim 1 wherein R is alkyl with from 1 to about 25 carbon atoms.

3. A toner in accordance with claim 1 wherein R is methyl, ethyl, propyl, butyl, pentyl, hexyl, heptyl, octyl, nonyl, decyl, undecyl, dodecyl, stearyl, lauryl, or mixtures thereof.

4. A toner in accordance with claim 1 wherein X is selected from the group consisting of 3,3',4,4'-benzophenone, 3,3',4,4'-biphenyl, 4,4'-oxydiphthalic, 2,2'-bis-(3,4-dicarboxyphenyl) hexafluoropropane, and 3,3',4,4'-diphenylsulfone.

5. A toner in accordance with claim 1 wherein said oxyalkylene is selected from the group consisting of diethylene oxide, dipropylene oxide, triethylene oxide, polypropylene oxide, and mixtures thereof.

6. A toner in accordance with claim 1 wherein the polyimide resin is selected from the group consisting of poly(2-methylpentyl benzophenone-imide), poly(trimethylhexyl benzophenone-imide), poly(diethoxy benzophenone-imide), poly(triethoxy benzophenone-imide), poly(diisopropoxy benzophenone-imide), poly(trisopropoxy benzophenone-imide), poly(2-methylpentyl 3,3,4,4'-biphenyl-imide), poly(trimethylhexyl 3,3,4,4'-biphenyl-imide), poly(diethoxy 3,3,4,4'-biphenyl-imide), poly(triethoxy 3,3,4,4'-biphenyl-imide), poly(diisopropoxy 3,3,4,4'-biphenyl-imide), poly(trisopropoxy 3,3,4,4'-biphenyl-imide), poly(tetraisopropoxy 3,3,4,4'-biphenyl-imide), poly(pentisopropoxy 3,3,4,4'-biphenyl-imide), poly(diethoxy 4,4'-oxydiphthalimide), poly(triethoxy 4,4'-oxydiphthalimide), poly(diisopropoxy 4,4'-oxydiphthalimide), poly(trisopropoxy 4,4'-oxydiphthalimide), poly(tetraisopropoxy 4,4'-oxydiphthalimide), poly(diisopropoxy 3,3',4,4'-diphenylsulfone-imide), poly(trisopropoxy 3,3',4,4'-diphenylsulfone-imide), poly(pentisopropoxy 3,3',4,4'-diphenylsulfone-imide), and mixtures thereof.

7. A toner in accordance with claim 1 wherein the polyimide has a $M_n$ of from about 1,500 to about 20,000, a $M_w$ of from about 2,500 to about 100,000, and wherein the polydispersity thereof is from about 1.5 to about 12.

8. A toner in accordance with claim 1 which possesses a low fixing temperature of from about 120° C. to about 145° C. and a broad fusing latitude of from about 40° C. to about 120° C.

9. A toner composition in accordance with claim 1 with a glass transition temperature thereof of from about 50° C. to about 65° C.

10. A toner composition in accordance with claim 1 with a relative humidity sensitivity of from about 1.01 to about 2.3.

11. A toner composition in accordance with claim 1 further including a charge enhancing additive incorporated into the toner, or present on the surface of the toner.

12. A toner composition in accordance with claim 1 further containing a wax component with a weight average molecular weight of from about 1,000 to about 10,000.

13. A toner composition in accordance with claim 1 further containing as external additives metal salts of a fatty acid, colloidal silicas, or mixtures thereof.

14. A toner composition in accordance with claim 1 wherein the pigment is carbon black, magnetites, or mixtures thereof, cyan, magenta, yellow, red, blue, green, brown, or mixtures thereof.

15. A developer composition comprised of pigment, and polyimide of the formula

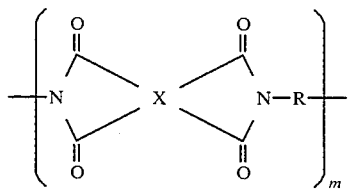

wherein m represents the number of monomer segments present; X is

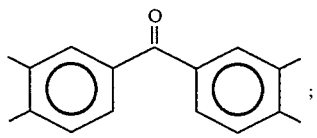

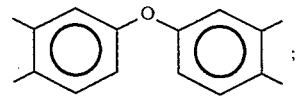

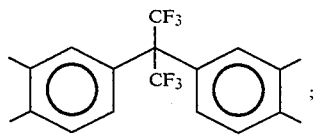

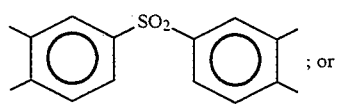 ; or

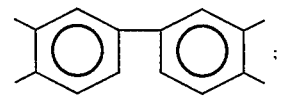

and R is independently selected from the group consisting of alkylene, oxyalkylene and polyoxyalkylene; and carrier particles.

16. A developer composition in accordance with claim 15 wherein the carrier particles are comprised of ferrites, steel, or an iron powder with an optional coating, or mixture of coatings.

17. A method of imaging which comprises formulating an electrostatic latent image on a negatively charged photoreceptor, affecting development thereof with the toner composition of claim 1, and thereafter transferring the developed image to a suitable substrate.

18. A toner in accordance with claim 1, which toner displays a low gloss of from about 0 to about 30 gloss units when transfixed onto paper at a process speed of from about 200 to about 500 millimeters per second.

19. A toner in accordance with claim 1, which toner displays a high gloss of from about 31 to about 90 gloss units when transfixed onto paper at a process speed of from about 1 to about 180 millimeters per second.

20. A toner in accordance with claim 1 wherein m is a number of from about 100 to about 100,000, and alkyl, oxyalkylene and polyoxyalkylene contain from 1 to about 25 carbon atoms.

21. A toner composition consisting essentially of pigment, and polyimide of the formula

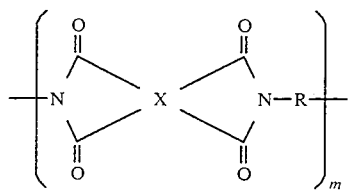

wherein m represents the number of monomer segments present; X is

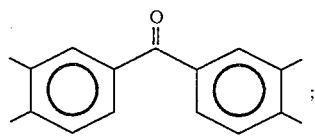

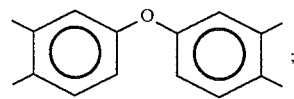

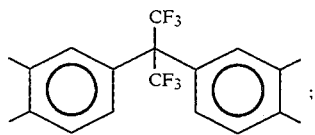

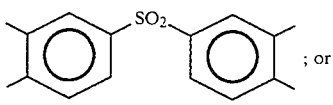

; or

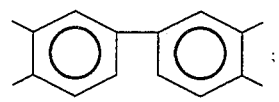

;

and R is independently selected from the group consisting of alkyl, oxyalkylene and polyoxyalkylene; and wherein M is a number of from about 100 to about 100,000.

22. A toner in accordance with claim 21 wherein the polyimide is selected from the group consisting of poly(2-methylpentyl benzophenone-imide), poly(trimethylhexyl benzophenone-imide), poly(diethoxy benzophenone-imide), poly(triethoxy benzophenone-imide), poly(diisopropoxy benzophenone-imide), poly(trisopropoxy benzophenone-imide), poly(2-methylpentyl 3,3,4,4'-biphenyl-imide), poly(trimethylhexyl 3,3,4,4'-biphenyl-imide), poly(diethoxy 3,3,4,4'-biphenyl-imide), poly(triethoxy 3,3,4,4'-biphenyl-imide), poly(diisopropoxy 3,3,4,4'-biphenyl-imide), poly(trisopropoxy 3,3,4,4'-biphenyl-imide), poly(tetraisopropoxy 3,3,4,4'-biphenyl-imide), poly(pentisopropoxy 3,3,4,4'-biphenyl-imide), poly(diethoxy 4,4'-oxydiphthalimide), poly(triethoxy 4,4'-oxydiphthalimide), poly(diisopropoxy 4,4'-oxydiphthalimide), poly(trisopropoxy 4,4'-oxydiphthalimide), poly(tetraisopropoxy 4,4'-oxydiphthalimide), poly(diisopropoxy 3,3',4,4'-diphenylsulfone-imide), poly(trisopropoxy 3,3',4,4'-diphenylsulfone-imide), and poly(pentisopropoxy 3,3',4,4'-diphenylsulfone-imide).

* * * * *